United States Patent
Thomsen et al.

(10) Patent No.: US 10,712,245 B2
(45) Date of Patent: Jul. 14, 2020

(54) FILTRATION SYSTEM FOR LIQUID SAMPLES

(71) Applicant: Foss Analytical A/S, Hilleroed (DK)

(72) Inventors: Henrik Thomsen, Hilleroed (DK); Christian Michelsen, Hilleroed (DK)

(73) Assignee: Foss Analytical A/S, Hilleroed (DK)

(*) Notice: Subject to any disclaimer, the term of this patent is extended or adjusted under 35 U.S.C. 154(b) by 494 days.

(21) Appl. No.: 15/528,819

(22) PCT Filed: Dec. 16, 2014

(86) PCT No.: PCT/IB2014/066951
§ 371 (c)(1),
(2) Date: May 23, 2017

(87) PCT Pub. No.: WO2016/097818
PCT Pub. Date: Jun. 23, 2016

(65) Prior Publication Data
US 2017/0322128 A1 Nov. 9, 2017

(51) Int. Cl.
*G01N 1/40* (2006.01)
*B01L 3/00* (2006.01)
*G01N 35/00* (2006.01)

(52) U.S. Cl.
CPC ............ *G01N 1/4077* (2013.01); *B01L 3/502* (2013.01); *B01L 2200/025* (2013.01); *B01L 2300/041* (2013.01); *B01L 2300/048* (2013.01); *B01L 2300/0681* (2013.01); *B01L 2300/123* (2013.01); *B01L 2400/049* (2013.01);
(Continued)

(58) Field of Classification Search
CPC .................................. G01N 1/4077
USPC .................................................... 73/863.23
See application file for complete search history.

(56) References Cited

U.S. PATENT DOCUMENTS

| 3,551,091 A | 12/1970 | Veloz |
| 2003/0206828 A1* | 11/2003 | Bell .................. A61M 1/14 422/44 |
| 2005/0103701 A1 | 5/2005 | Bechtum et al. |

(Continued)

FOREIGN PATENT DOCUMENTS

| EP | 2545993 A1 | 1/2013 |
| WO | WO-03076041 A1 | 9/2003 |

OTHER PUBLICATIONS

International Search Report PCT/ISA/210 for International Application No. PCT/IB2014/066951 dated Jul. 9, 2015.
(Continued)

*Primary Examiner* — Walter L Lindsay, Jr.
*Assistant Examiner* — Philipmarcus T Fadul
(74) *Attorney, Agent, or Firm* — Harness, Dickey & Pierce, P.L.C.

(57) ABSTRACT

A filtration system for a liquid comprising a container (2) having an internal container volume (11), a particulate filter portion (10) for allowing passage of the liquid into the internal container volume (11) to form a liquid sample aliquot and a first opening (14) providing access to the internal container volume (11); the filtration system further comprising a non-porous housing (4) configured to provide an internal space (28) for receiving the container (2), the internal space (28) being dimensioned to provide a volume such that the amount left unoccupied by the received container (2) is less than the internal container volume (11).

16 Claims, 4 Drawing Sheets

(52) U.S. Cl.
CPC .............. *B01L 2400/0487* (2013.01); *G01N 2001/4088* (2013.01); *G01N 2035/00475* (2013.01)

(56) References Cited

U.S. PATENT DOCUMENTS

| | | |
|---|---|---|
| 2006/0029923 A1 | 2/2006 | Togawa et al. |
| 2007/0082370 A1 | 4/2007 | Togawa et al. |
| 2007/0105156 A1 | 5/2007 | Togawa et al. |
| 2013/0017129 A1 | 1/2013 | Shioyama et al. |

OTHER PUBLICATIONS

Written Opinion of the International Searching Authority PCT/ISA/237 for International Application No. PCT/IB2014/066951 dated Jul. 9, 2015.

\* cited by examiner

FILTRATION SYSTEM FOR LIQUID SAMPLES

CROSS-REFERENCE TO RELATED APPLICATIONS

This application is a national phase under 35 U.S.C. § 371 of PCT International Application No. PCT/IB2014/066951 which has an International filing date of Dec. 16, 2014, the entire contents of which is hereby incorporated by reference.

The present invention relates to a filtration system and to a method for providing a liquid sample.

There are many situations where it is desirable to perform compositional analysis of a liquid sample. Often the sample needs to be filtered before compositional analysis is performed in order to remove interfering particles that may be present in the sample and which could, for example, affect the analysis results or perhaps any transport system which is employed to introduce the liquid sample to or remove the liquid sample from an analysis region of an instrument used to perform the compositional analysis.

Often a filter is located at an inlet of such an instrument or is located in the flow path of the transport system just before the analysis region in an attempt to prevent adverse effects of interfering particles. However, when such filters block they can be difficult to unblock or replace and liquid flow into the analysis region is still adversely affected.

To alleviate this problem external filtration systems are employed. Centrifuge type filtration systems are known but are relatively expensive and slow. Pressure filtration systems are also known where the liquid is pressed or drawn through a filter medium, such as filter paper and collected in a separate container for transfer to an instrument for compositional analysis.

It is the aim of the present invention to provide an alternative filtration system for liquid samples.

According to a first aspect of the present invention there is provided a filtration system for a liquid comprising a container having an internal container volume, a particulate filter portion for allowing passage of the liquid into the internal container volume to form a liquid sample aliquot and a first opening providing access to the internal container volume wherein the filtration system further comprises a non-porous housing configured to provide an internal space for receiving the container, the internal space being dimensioned to provide a volume such that the amount left unoccupied by the received container is less than the internal container volume. Thus a filtered liquid sample aliquot may be provided without the need for a separate filter element associated with an analysis instrument.

In some embodiments the filter portion comprises a sheet material formed to provide walls delimiting the container. This has an advantage that the available filter area is increased which will help speed up the filtration process. In order to provide some rigidity to the container when such sheet material is employed a rigid framework may be provided as a part of the container, to which framework the walls are attached.

In some embodiments the filter system may comprise a lock mechanism having a first lock part for connection with, possibly provided in permanent connection to, the container and a second lock part for connection with, possibly provided in permanent connection to, external equipment, such as a pump, for example a syringe pump; the first and the second lock parts being cooperable to releasably hold, such as for example by push-fit; snap-fit or screw-fit engagement with one another, the first opening in communication with the pump or other external equipment. In this manner a gas connection may be simply and reliably made between the internal container volume and the pump. Employing a pump advantageously enhances the speed of filtration.

According to a second aspect of the present invention there is provided a method for providing a liquid sample by employing a filtration system as claimed in any preceding claim comprising the steps of: contacting some or all of the filter portion with a liquid to be sampled; transferring, preferably with the aid of suction caused by a pump connected to the container, liquid through the contacted filter portion into the internal container volume to form a liquid sample aliquot; Since the method employs a filtration system according to the first aspect of the present invention then advantages associated with this system will accordingly associate with the method according to the second aspect.

These and other advantages should become more apparent from a consideration of the following description of exemplary embodiments of the invention, made with reference to the drawings of the accompanying figures, of which:

Figure 1:
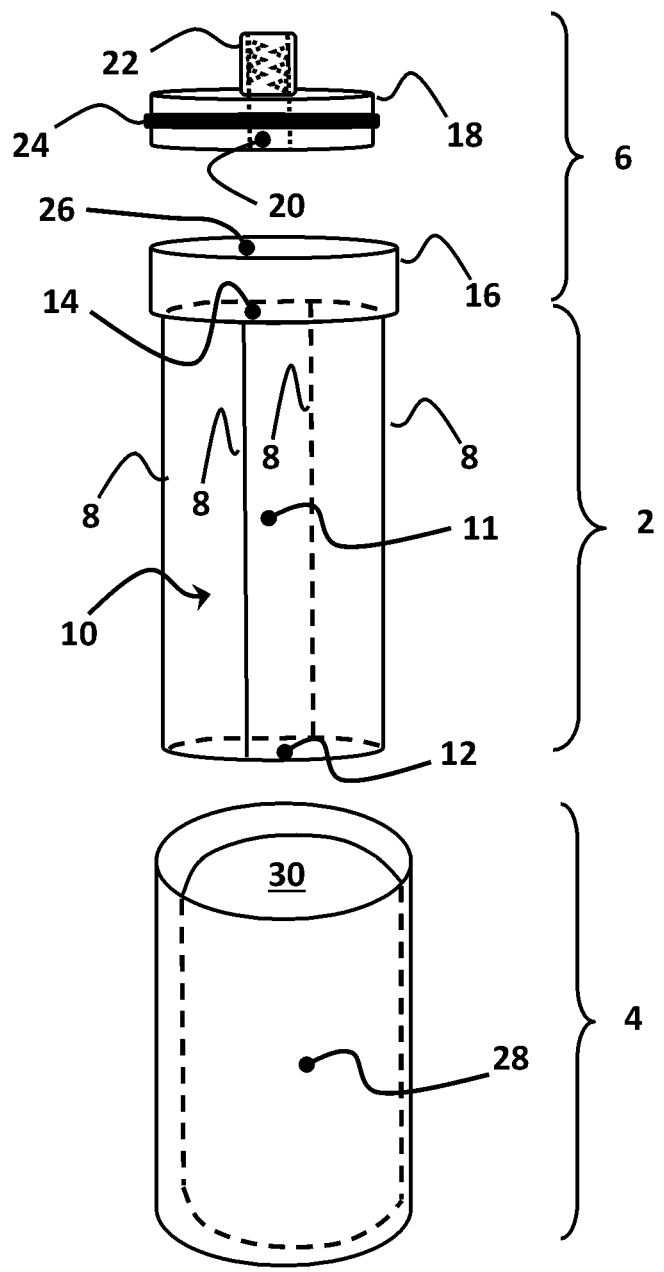
FIG. 1 illustrates a first embodiment of a filter system according to the present invention.

An exemplary first embodiment of a filtration system according to the present invention is illustrated in FIG. 1 as comprising a container 2; a non-porous housing 4; and a lock mechanism 6.

The container 2 here comprises a framework having rigid leg portions 8 about which is fixed a porous sheet material 10, for example fabricated from a polymer such as polyesters, polyethylene or nylon or may be formed of porous metal, ceramic or glass structures, to provide a container body and an end wall 12 which together help define an internal container volume 11. The container 2 is also configured with a first opening 14 in the end of the container 2 opposing the end wall 6, through which first opening 14 the internal container volume 11 may be accessed.

The non-porous housing 4 is configured to provide an internal space 28 for receiving the container 2 through a second opening 30. The internal space 28 is dimensioned to provide a volume such that the amount left unoccupied by a received container 2 is less than the internal container volume 11. In some embodiments the internal space 28 may be dimensioned to be substantially equal to the external dimensions of the received container 2. In this manner little or no liquid will be capable of passing from the internal container volume 11 into the internal space 28 when the container 2 has been received in the non-porous housing 4.

The lock mechanism 6 of the present exemplary embodiment comprises a first lock part in the form of a female connector 16 and a second lock part in the form of a male connector 18. The male connector 18 is formed with a through hole 20 which is terminated with a (here internally threaded for example) nipple 22. The male connector 18 is also provided with a resilient washer 24 about its periphery. The female connector 16 is here permanently connected to and may, in some embodiments, be formed integral with, possibly to function as a part of, the framework of the container 2 and extends as an upwardly projecting flange about the periphery of the first opening 14 of the container 2. The female connector 16 is internally dimensioned to receive the male connector 18 in a push-fit engagement, the resilient washer 24 being slidably engagable with an inner surface 26 of the female connector 16 to enhance a gas tight seal between the engaged male 18 and the female 16 connectors. Thus when the male connector 18 is received in the female connector 16 a fluid communication is established between the internal container volume 11 and external of the container 2 from the resulting juxtaposition of the first opening 14, the through hole 20 and the nipple 22.

Figure 2:
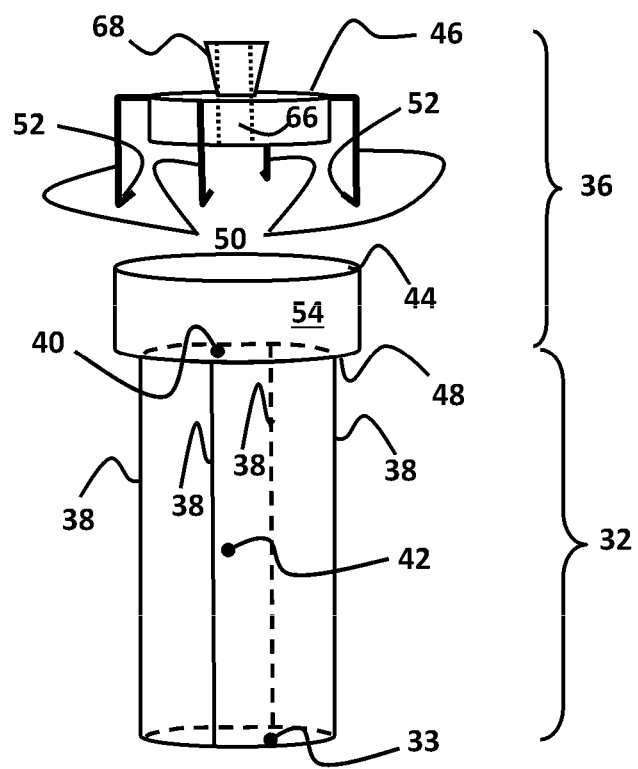
FIG. 2 illustrates a second embodiment of a filter system according to the present invention.
Figure 2:
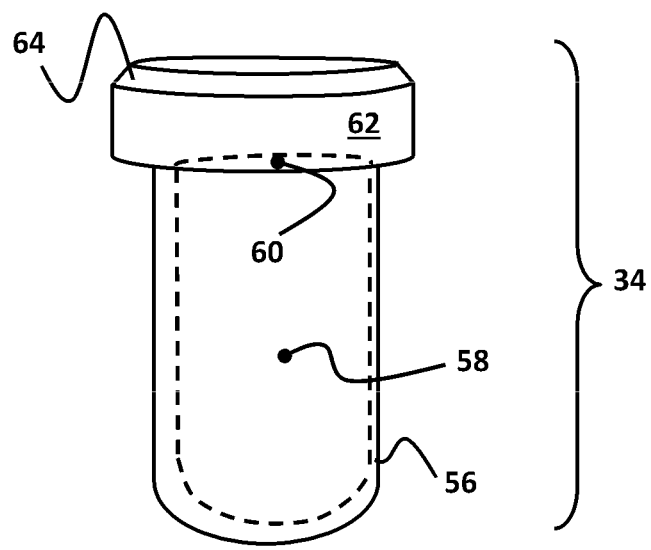

An exemplary second embodiment of the filtration system according to the present invention is illustrated in FIG. 2 as comprising a container 32; a non-porous housing 34 and a lock mechanism 36.

The container 32, in common with that illustrated in FIG. 1, is cylindriform and comprises side-walls and an end wall 33 formed of a porous sheet material affixed to framework having rigid leg portions 38. The container 32 has a first opening 40 located in an end opposite the end wall 33 to provide access to an inner container volume 42 which is defined by the porous sheet material.

The lock mechanism 36 is again comprised of a first lock part 44 and a second lock part 46. The first lock part 44 is permanently attached to the container 32 as a flange located about the first opening 40 and is provided with a shoulder 48 facing the end wall 33. The second lock part 46 comprises a peripheral array of downwardly extending flexible tines 50 each provided with an inwardly facing tooth 52 at its lower end with which to engage with the shoulder 48. As the first lock part 44 and second lock part 46 are pushed together the inwardly facing tooth 52 contacts an outer surface 54 of the first lock part 44 which causes the tines 50 flex outwards. As the teeth 52 are pushed past this outer surface 54 the tines 50 bias the teeth 52 inwards to engage with shoulder 48 to thereby hold the first 44 and the second 46 lock parts in a snap-fit engagement. A through hole 66 in the second lock part 46 is terminated with a nipple 68 (in the present embodiment provided with a tapering internal surface) and intended to provide a gas connection to the internal container volume 42 when the first 44 and the second 46 lock parts are engaged.

The non-porous housing 34 comprises a generally cylindriform hollow body portion 56 providing an internal space 58. A second opening 60 is provided in the housing 34 through which the container 32 may be received into the internal space 58. The internal space 58 is dimensioned such that a volume remaining unoccupied by a received container 32 is less than the internal volume 42 of the container 32 so that when inserted into the housing 32 at least a portion of a liquid sample aliquot will remain within the internal volume 42. The housing 34 is provided with a release mechanism as an upwardly extending rigid surface 62 with an upper mating surface 64. The mating surface 64 is chamfered to engage with the teeth 52 of the second lock part 46 as the container 32 is inserted into the internal space 58 of the housing 34 to cause outward flexure of the tines 50 and the consequent disengagement of teeth 52 from the shoulder 48 as the container 32 continues to be inserted into the internal space 58. In this manner the first 44 and the second 46 lock parts become automatically un-coupled with insertion of the container 32 into the housing 34.

Figure 3:
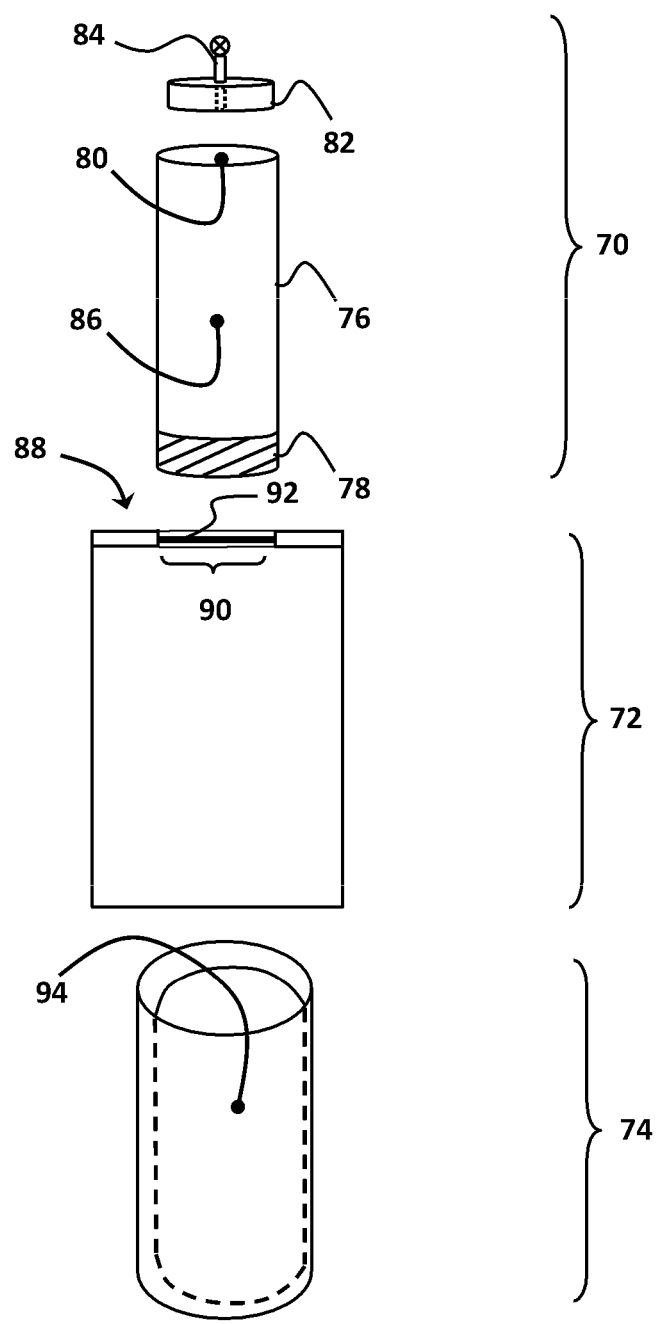
FIG. 3 illustrates a third embodiment of a filter system according to the present invention.

A third exemplary embodiment of a filtration system according to the present invention is illustrated in FIG. 3 as comprising a container 70; a sample holder 72 and, optionally, a non-porous holder 74.

The container 70 here comprises a hollow, non-porous body section 76 having a porous end-wall portion 78 and an open opposite end 80. The body section 76 and the end-wall portion 78 cooperate to delimit an internal container volume 86. The container 70 of the present embodiment further comprises a removable non-porous lid 82 in which there is provided a vent 84 which is sealable to prevent ingress of air into the internal container volume 86, in some embodiments such as by a pinch clip; on-off valve or in another manner known in the art. The lid 82 forms a removable closure for open end 80 of the container 70. In a variation of the embodiment the vent 84 may be omitted.

The sample holder 72 is provided with an end 88 in which there is provided an opening 90 dimensioned for sliding engagement with the body section 76 of the container 70 so that a liquid seal is formed between the body section 76 and the inner surface of the opening 90. Usefully, but not essentially, to enhance the liquid seal a sealing ring 92, such as a resilient washer, may be located about the opening 90 to seal against the body section 76 as the container 70 slides into the sample holder 72. This sample holder 72 may optionally function as the non-porous holder 74 to in use retain the liquid holding container 70.

The non-porous holder 74, when provided, is again configured with an internal space 94 which is dimensioned to be the same or only slightly greater than the volume occupied by the container 70 when it is received therein. Thus liquid held within the inner container volume 86 will largely remain within the container 70 when the container is located in the holder 74.

With the sample holder 72 essentially filled with liquid then any liquid which is displaced as the container 70 slides into the sample holder 72 is forced to pass through the porous end wall portion 78 and into the inner volume 86 of the container 70 to form a liquid sample aliquot which may be presented for compositional analysis. It will be appreciated that here the term 'essentially filled' will be understood to mean filled with sufficient liquid so that the volume of the sample holder 72 which remains unoccupied by liquid is less than a desired volume of liquid sample aliquot to be displaced into the inner container volume 86.

Air within the inner volume 86 is vented through the vent 84 of the lid (or, in embodiments without the vent 84 the lid is left off until the collection of the liquid sample aliquot is completed) as it is replaced with liquid entering the inner volume 86 as it is filtered through the porous end wall portion 78. In a modification to this embodiment a pump, a syringe pump for example, is connectable to the open opposite end 80 of the container 70, for example via the vent 84, such as by means of a flexible conduit, and may be operated to create an under pressure within the inner container volume 86. Transfer of liquid into the inner volume 86 is thereby enhanced through the suction effect of the pump. Continued connection of the pump to the vent 84 after the transfer of liquid also provides an effective seal to the vent 84.

Figure 4:
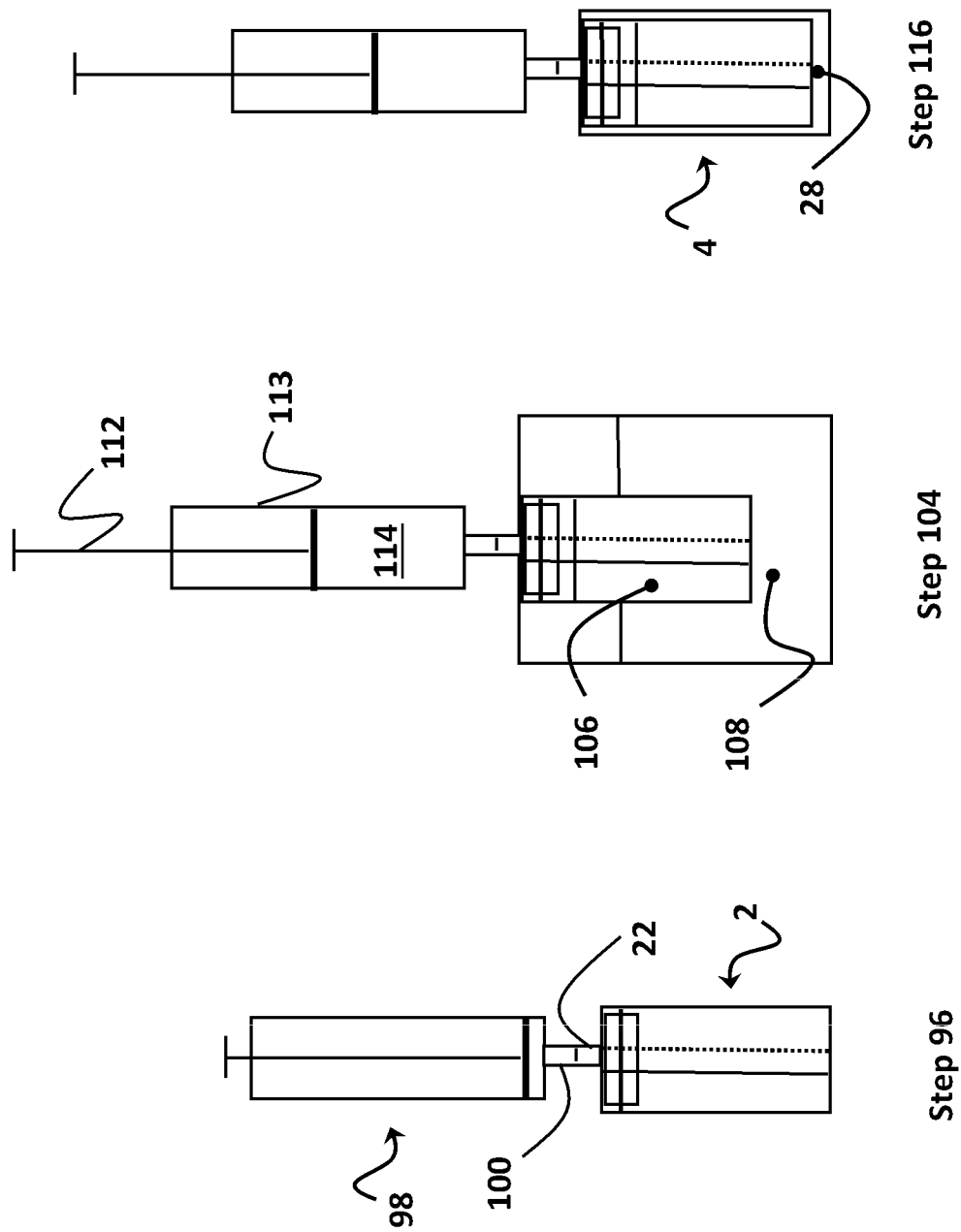
FIG. 4 illustrates a method of employing a filter system according to the present invention to obtain a filtered sample.

An exemplary method of obtaining a liquid sample aliquot will now be described in relation to FIG. 4 using a filtration system according to the present invention, here for example using that system described in respect to FIG. 1.

At a preparation step 96 the container 2 is releasably coupled to a pump, here a syringe pump 98 by means of the lock mechanism 6, the second lock part 16 of which is connectable via the nipple 22 to an inlet 100 of the syringe pump 98. By way of illustration only, in the present example the inlet 100 of the syringe pump 98 is provided with a threaded portion 102 which complements the internally threaded portion of the nipple 22 so that the second lock part 16 may be screw fit to the syringe pump 98. In other embodiments the second lock part 16 may be provided in permanent connection to the pump 98. The first lock part 18 engages with the second lock part 16 in a push fit releasable connection so that the internal container volume 11 is held in a gas communication with internal of the syringe pump 98 by the releasable lock mechanism 6.

At a collection step 104 a liquid sample aliquot 106 is collected. Here the porous portion 10 of the sample container 2 is immersed in a liquid sample 108, here illustrated as being held in a beaker 110. The pump 98 is operated to create an under pressure in the internal container volume 11, for example a piston112 of the syringe pump 98 is moved within the syringe pump 98 to increase the gas receiving volume 114 of syringe cylinder body 113. As a result an under pressure is established within the inner container volume 11. Liquid sample 108 is drawn from the beaker 110 into the inner container volume 11 to form the liquid sample aliquot 106 which is filtered by the porous portion 10 to remove particles from the liquid sample 108.

In embodiments where the sample container 2 is to be removed from the liquid sample 108 and transferred to a non-porous holder 4 it is useful that the amount of liquid sample aliquot 106 which is collected at this collection step 204 is sufficient to ensure that the porous portion 10 is completely covered (on the inside of the inner container volume 11). This prevents air from entering the inner container volume 11 when the container 2 is removed. In some embodiments there may be sufficient particulates in the liquid sample 108 to be relied upon to coat the porous portion 10 (on the outside of the inner container volume 11) and thereby prevent air from entering the inner container volume 11. In other embodiments the container (for example the container 70 described in connection with the embodiment of the filter system of FIG. 3) may remain inside the holder (for example when using a sample holder 72 described in connection with the embodiment of the filter system of FIG. 3).

At a presentation step 116 of the example of the method according to the present embodiment the container 2 containing the liquid sample aliquot 106 is removed from the liquid sample 108 whilst air is prevented from re-entering, pre the internal container volume 11. This may be achieved by maintaining the syringe pump 98 in releasable coupling to the container 2, as is illustrated or, for example and not illustrated, in a further embodiment of the method the container may be provided with a sealable closure which is closed after the liquid sample aliquot 106 is obtained and the syringe pump 98 then disconnected from the container by separating the first 18 and the second 16 lock parts. The combination of maintained under pressure and surface tension of the liquid inhibits flow of the liquid sample aliquot 106 back through the pores of the porous portion 10 and thus the sample aliquot 106 remains contained in the container 2.

In the present embodiment, at this presentation step 116 the container 2 connected to the syringe pump 98 is transferred into the non-porous holder 4 and the first 18 and the second 16 lock parts pulled apart to break the gas connection between pump 98 and the internal container volume 11 only when the container 2 is properly received in the internal space 28 of the holder 4. Since the internal space 28 is designed to have a volume that is only slightly greater than the volume occupied by the container 2 then only a small portion of the liquid sample aliquot 106 (not more than the difference in volumes occupied by the container 2 and that of the internal space 28) will be able to flow out of the container 2 when the gas connection is broken and the under pressure thereby removed. The portion of the liquid sample aliquot 106 which remains within the internal container volume 11 after the pump 98 is disconnected from the container 2 is then available for presentation as a filtered liquid sample, for example for compositional analysis.

It will be appreciated that the pore size(s) of the porous portions 10;78 are to be selected in dependence of the expected particle sizes in the liquid to be filtered into the internal container volume 11;42;86 and in consideration that surface tension is to be employed to help retain the liquid sample aliquot 106. For example, a pore size of around 12 microns (μm) has been found suitable when used for wine and may typically range between 6 μm and 50 μm and preferably between 6 μm and 25 μm when used for other liquids.

The invention claimed is:

1. A filtration system for a liquid, the filtration system comprising:

a container including a container body and an end wall at least partially defining an internal container volume of the container, the container body and the end wall formed of a porous sheet material affixed to a rigid framework, the porous sheet material configured to allow passage of the liquid into the internal container volume to form a liquid sample aliquot, the container further including a first opening to the internal container volume, the first opening in an end opposite to the end wall; and a non-porous housing closed at one end and including an opposite open end such that the non-porous housing defines an internal space, the internal space having an internal volume that is equal to or greater than a volume occupied by the container when the container is inserted into the internal space via the open end and is smaller than a sum of the internal container volume and the volume occupied by the container when the container is inserted into the internal space via the open end, such that a size of an unoccupied portion of the internal space that is left unoccupied by the container when the container is inserted into the internal space via the open end is less than the internal container volume, wherein the container is configured to be coupled to a pump, at a container end that is opposite the end wall, such that the container is further configured to establish suction in the internal container volume to draw liquid into the internal container volume via the porous sheet material, based on operation of the pump, to establish the liquid sample aliquot within the internal container volume, maintain the suction in the internal container volume, whilst the container is removed from contact with the liquid and the container is inserted into the internal space of the non-porous housing, such that the liquid sample aliquot remains within the internal container volume whilst the is removed from contact with the liquid and the container is inserted into the internal space of the non-porous housing, and remove the suction in the internal container volume subsequently to the container being inserted into the internal space of the non-porous housing.

2. The filtration system as claimed in claim 1, further comprising:

a releasable lock mechanism configured to be releasably engaged with the container, the releasable lock mechanism having a first lock part and a second lock part, the first lock part configured to be connected to the container, the first lock part and the second lock part configured to be releasably engaged with each other.

3. The filtration system as claimed in claim 2, wherein
the second lock part is configured to be connected to the pump, and
the first lock part and the second lock part are configured to releasably engage with each other to hold the first opening in gaseous communication with the pump.

4. The filtration system as claimed in claim 2 wherein
one lock part of the first lock part and the second lock part includes a peripheral array of resilient tines, each resilient tine including a separate inwardly projecting tooth,
another lock part of the second lock part and the first lock part includes a mating member, and
each resilient tine is flexible, such that the peripheral array of resilient tines is configured to effect a snap fit engagement of the inwardly projecting teeth of the peripheral array of resilient tines with the mating member.

5. The filtration system as claimed in claim 4, wherein
the second lock part includes the peripheral array of resilient tines, and
the non-porous housing includes a release mechanism, the release mechanism co-operable with the peripheral array of resilient tines to disengage the first lock part from the second lock part based on the container being received into the internal space of the non-porous housing.

6. The filtration system as claimed in claim 5, wherein the release mechanism includes an upwardly extending flange located around an opening of the non-porous housing, the upwardly extending flange having a surface configured to engage with each inwardly projecting tooth of each resilient tine of the peripheral array of resilient tines to cause flexure of the peripheral array of resilient tines to disengage the inwardly projecting teeth of the peripheral array of resilient tines from the mating member of the first lock part.

7. The filtration system as claimed in claim 2, wherein the first lock part and the second lock part include complementary male and female connectors configured for push-fit engagement with each other, respectively.

8. The filtration system as claimed in claim 1, wherein the porous sheet material includes pores sized between 6 μm and 50 μm.

9. A method for providing a liquid sample by employing a filtration system, the method comprising:
releasably connecting a container to a pump, the container including a container body and an end wall at least partially defining an internal container volume of the container, the container body and the end wall formed of a porous sheet material affixed to a rigid framework, the porous sheet material configured to allow passage of a liquid into the internal container volume to form a liquid sample aliquot, the container further including a first opening to the internal container volume, the first opening in an end opposite to the end wall
collecting the liquid sample aliquot based on operating the pump to establish suction in the internal container volume and further immersing the porous sheet material in a liquid to be sampled, such that liquid is drawn into the internal container volume via the porous sheet material, based on the suction, to establish the liquid sample aliquot within the internal container volume;
maintaining the suction in the internal container volume, whilst the container is removed from contact with the liquid and the container is inserted into an internal space of a non-porous housing, such that the liquid sample aliquot remains within the internal container volume whilst the container removed from contact with the liquid and the container is inserted into the internal space of the non-porous housing, the internal space having an internal volume that is equal to or greater than a volume occupied by the container in the internal space and is smaller than a sum of the internal container volume and the volume occupied by the container in the internal space, such that a size of an unoccupied portion of the internal space that is left unoccupied by the container is less than the internal container volume; and
removing the suction in the internal container volume subsequently to the container being inserted into the internal space of the non-porous housing.

10. The method of claim 9, further comprising:
releasably engaging a releasable lock mechanism with the container, the releasable lock mechanism including a first lock part and a second lock part, the first lock part configured to be connected to the container, the first lock part and the second lock part configured to be releasably engaged with each other.

11. The method as claimed in claim 10, wherein
the second lock part is configured to be connected to the pump, and
the first lock part and the second lock part are configured to releasably engage with each other to hold the first opening in gaseous communication with the pump.

12. The method as claimed in claim 10 wherein
one lock part of the first lock part and the second lock part includes a peripheral array of resilient tines, each resilient tine including a separate inwardly projecting tooth,
another lock part of the second lock part and the first lock part includes a mating member, and
each resilient tine is flexible, such that the peripheral array of resilient tines is configured to effect a snap fit engagement of the inwardly projecting teeth of the peripheral array of resilient tines with the mating member.

13. The method as claimed in claim 12, wherein
the second lock part includes the peripheral array of resilient tines, and
the non-porous housing includes a release mechanism, the release mechanism co-operable with the peripheral array of resilient tines to disengage the first lock part from the second lock part based on the container being received into the internal space of the non-porous housing.

14. The method as claimed in claim 13, wherein the release mechanism includes an upwardly extending flange located around an opening of the non-porous housing, the upwardly extending flange having a surface configured to engage with each inwardly projecting tooth of each resilient tine of the peripheral array of resilient tines to cause flexure of the peripheral array of resilient tines to disengage the inwardly projecting teeth of the peripheral array of resilient tines from the mating member of the first lock part.

15. The method as claimed in claim 10, wherein the first lock part and the second lock part include complementary male and female connectors configured for push-fit engagement with each other, respectively.

16. The method as claimed in claim 9 wherein the porous sheet material includes pores sized between 6 μm and 50 μm.

* * * * *